Patented Feb. 21, 1939

2,148,294

UNITED STATES PATENT OFFICE 2,148,294

PRODUCTION OF VALUABLE PRODUCTS FROM KETOLS AND/OR ALDOLS

Sumner H. McAllister, Lafayette, Craig M. Bouton, Canyon, and William A. Bailey, Jr., Berkeley, Calif., assignors to Shell Development Company, San Francisco, Calif., a corporation of Delaware No Drawing. Application January 21, 1938, Serial No. 186,150

16 Claims. (Cl. 260—541)

This invention relates to reactions of hydroxy-"ketaldones" by which it is meant to designate generically hydroxy-ketones and hydroxy-aldehydes in conformity with the usage adopted in United States Patent 2,085,776. Our invention deals with a new reaction of hydroxy-ketaldones whereby carboxylic acids and olefines and/or olefine polymerization products may be obtained.

Our invention essentially comprises contacting ketaldones which have a carbinol group directly joined to an aliphatic carbon atom to which at least one hydrogen atom is attached, with non-basic catalysts at a temperature above about 160° C. but below the temperature at which substantial thermal decomposition with liberation of carbon monoxide takes place.

Suitable hydroxy-ketaldones which may be used as starting material for the production of carboxylic acids and olefines or olefine polymers in accordance with the process of our invention are, for example, those of the type

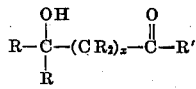

where $x$ is an integer which may be zero and any or all of the R's may be hydrogen or the same or different alkyl or cyclic or alicyclic groups, except that at least one non-carbonylic carbon atom directly linked to the carbinol group should have at least one hydrogen attached thereto, e. g. when $x$ is zero, or when neither R in the $CR_2$ group directly joined to the carbinol group is hydrogen, at least one of the R's directly connected to the carbinol group must be an

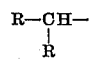

group. R' may be hydrogen or an alkyl or an alicyclic group joined to the carbonyl group by an aliphatic carbon atom having at least one hydrogen atom attached thereto. Any or all of the alkyl or cyclic or alicyclic groups present may contain olefinic linkages and/or substituents such as halogen, hydroxyl, or other suitable groups or elements which may be non-reactive or which may be split off or otherwise reacted without interfering with the process of our invention. The cyclic and/or alicyclic groups may be carbocyclic or heterocyclic in nature. Such hydroxy-ketaldones may be obtained as condensation products of suitable ketones and/or aldehydes as described in United States Patent 1,714,378, for example, or by hydrolysis of the corresponding halogenated ketones or aldehydes as by the method of United States Patent 1,961,630, for example, or by other suitable methods. They may be used as pure chemical individuals or as mixtures thereof or as crude products containing other compounds which may or may not be reactive under the operating conditions employed in our process.

The hydroxy-ketaldone or hydroxy-ketaldone-containing mixture used in any particular case will depend upon the product or products desired. Where it is economically feasible we prefer to employ hydroxy-ketaldones having a carbinol group separated from the carbonyl group by not more than two carbon atoms neither of which is quaternary, and more preferably by one carbon atom having an alpha hydrogen atom. We find that hydroxy-ketaldones having at least one tertiary carbinol group are most preferable for our reaction and that those having a secondary carbinol group are to be preferred over those having only primary carbinol groups. We generally prefer to employ aliphatic hydroxy-ketaldones rather than those containing aromatic groups if all other considerations are the same.

For purposes of clarity only, further specific references will be made to reactions of our preferred class of compounds in the presence of our preferred acid-acting catalysts. These are the acids of phosphorus, particularly the phosphoric acids but it will be understood that by so doing we imply no limitation on the process of our invention, as other catalysts such, for example, as silica gel, zinc chloride, ferric chloride, ferrous sulfate, sodium acid sulfate, sulfuric acid preferably deposited on charcoal or the like as described and claimed in application Serial No. 137,798 filed by Moravec, Schelling and Oldershaw April 19, 1937, boryl phosphates containing an atomic ratio of phosphorus to boron greater than one, and the like may be used provided suitable adjustments are made in the other reaction conditions. The catalysts may be used with or without supports and single catalysts or mixtures with or without activators such as metal oxides or the like may be used. A particularly advantageous method of preparing catalysts of our preferred type is described, for example, in United States Patent 2,018,065 but other methods may also be used and in certain cases modifications of the method of the patent particularly with a view to reducing the final free acid content of the catalyst, are desirable.

The process may be carried out in any suitable apparatus. A simple assembly which has been found to be useful comprises a heated tube wherein the catalyst, advantageously in the form of granules, may be packed. When diacetone alcohol, for example, is passed, at a temperature preferably between about 200° C. and about 350° C., over a catalyst prepared by calcining at between 180° C. and 300° C. a mixture of a phosphoric acid and a siliceous material such as kieselguhr or the like, acetic acid and isobutylene are obtained in accordance with the reaction.

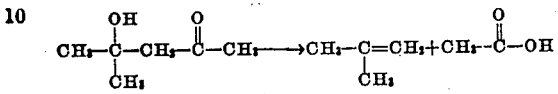

By passing the exit gases thru a suitable condenser the acetic acid may be separated and the isobutylene separately recovered. Depending on the reaction conditions, side reactions such as dehydration to mesityl oxide, decomposition to acetone, polymerization of isobutylene and pyrolysis with evolution of carbon monoxide, may be encountered. These reactions may be substantially completely avoided or suppressed by proper choice of catalyst and/or operating conditions. Low temperatures favor dehydration to mesityl oxide and with most catalysts this reaction becomes the predominating one at temperatures below about 160° C. At excessive temperatures pyrolysis with evolution of carbon monoxide takes place which can be avoided by operating at below about 400° C. The breaking down of diacetone alcohol into acetic acid and isobutylene is one of directional decomposition. The temperature at which the reaction occurs is such that in the absence of a catalyst, and at somewhat slower rate, the decomposition goes in the direction of acetone, but the effect of the catalyst is to cause the molecular rearrangement to acid and olefine which we have discovered. Low acidity of catalyst also favors acetone formation and it is on this account in part that we prefer phosphoric acid catalysts to catalysts of the type of silica gel, for example. Low acidities are desirable, however, where polymerization of the olefine produced, particularly tertiary olefines such as isobutylene, is to be avoided. In general we find that with catalysts prepared from acids of phosphorus, the higher the total phosphorous content (determined as phosphorous pentoxide) the better the conversion of hydroxy-ketaldones to carboxylic acids and olefines and we preferably employ catalysts having a phosphorous content equivalent to at least 50% $P_2O_5$ by weight or 22% by weight of phosphorus. The lower the free acid content the less polymerization of, for example, isobutylene to di-isobutylene and higher polymers. A free acidity of not more than about 10% calculated as $H_3PO_4$ is desirable with an acidity below about 5% even more preferable. A convenient method of preparing a catalyst which combines many advantages comprises calcining a mixture of orthophosphoric acid and kieselguhr in accordance with the teachings of U. S. Patent 2,018,065 and water washing the product in the form of 6 to 8 mesh particles using about 7 liters of water per kilo of catalyst and allowing the water to flow up thru the catalyst over a period of about thirty minutes. The catalyst may then be rinsed with distilled water and dried at 110° C. for 15 hours. About 700 grams of catalyst are recovered per kilo of starting material. The total phosphorous content of the catalyst in one typical instance was found to have been reduced from 60.4% (expressed as $P_2O_5$) to 59.0% while the free acid calculated as $H_3PO_4$ had been reduced from 25% to 4.6%.

The results obtained by reacting diacetone alcohol at 250° C. and a feed rate of 1.43 volumes of liquid per hour per volume of catalyst were:

| | Conversion to acetic acid | Conversion to unpolymerized isobutylene |
| --- | --- | --- |
| | Percent | Percent |
| Untreated catalyst | 83.3 | 65.0 |
| Water washed catalyst | 79.7 | 81.6 |

The best temperature for high yields of both acetic acid and unpolymerized isobutylene from diacetone alcohol using a feed rate of 1.43 volumes of liquid per hour per volume of the above water washed catalyst appears to be about 250° C. to about 275° C. as shown by the following results obtained under otherwise comparable conditions:

*Mol per cent of products*

| Temperature | Acetic acid | Isobutylene | Acetone | Mesityl oxide |
| --- | --- | --- | --- | --- |
| 211° C | 59.6 | 56.4 | 10.3 | 27.1 |
| 250° C | 78.9 | 78.9 | 9.3 | 9.5 |
| 265° C | 86.7 | 86.7 | 9.5 | 3.7 |
| 274° C | 81.5 | 83.5 | 7.8 | 2.5 |
| 300° C | 66.5 | 67.3 | 23.0 | 1.5 |

We have been able to prepare acetic acid of glacial strength (greater than 99.5%) which is water white and very stable in a very simple and economical manner using the process of our invention. It is only necessary to cool the reaction gases and separate the isobutylene and acetone in a simple column. To the resulting bottoms sufficient water may be added so that on distillation azeotropes of mesityl oxide and di-isobutylene with water and only small amounts of acetic acid may be removed. Redistillation of the resulting bottoms removes small amounts of hydrocarbon polymers and higher ketones as the final bottom product and permits the recovery of substantially pure acetic acid as overhead product. Pressure distillation of the first distillate allows ready separation of isobutylene of better than 99% purity from acetone bottoms. The latter may be condensed to diacetone alcohol and recycled to the process. Other procedures for recovering and purifying the products may obviously be used, the addition of water for the azeotropic distillation, may for example, be eliminated and simple fractionation substituted.

The process may be carried out continuously, intermittently or batchwise. Atmospheric or elevated or reduced pressures may be employed.

While we have emphasized diacetone alcohol in the foregoing discussion because it is typical of the hydroxy-ketaldones which we find give particularly good yields of either carboxylic acids or olefines or both in the process of our invention, other compounds have been found to also give good results. Thus propionic acid and tertiary amylene have been obtained from the condensation products of methyl-ethyl ketone by the same treatment. The invention is not limited to reactions in which tertiary olefines are produced, however, as shown by the following experiment.

The secondary beta-ketol, 4-hydroxy pentanone-2 was passed over 42 cc. of phosphoric acid catalyst at a rate of 1 cc. per minute and at a temperature of 265° C. The reacted gases were passed first thru a water cooled condenser provided with a receiver for condensate and then thru a cold trap. Approximately 52% of the reaction product resulted from the conversion of this ketol to normal butylene and acetic acid. 45% of the reaction product resulted from dehydration of the ketol to methyl propenyl ketone and a small amount of acetone and acetaldehyde was also obtained.

Similarly dimethyl ketol

has been converted to acetic acid and ethylene, and aldol has yielded formic acid and propylene.

It will thus be evident that our invention provides a new source of a wide variety of carboxylic acids and olefines and/or olefine polymers of many different types. The invention is not only capable of wide variation with respect to the hydroxy-ketaldones which may be reacted and the catalysts which may be used but also the operating details may be greatly varied to adopt the process to varying demands for the different products which may be produced thereby. It will therefore be clear that our invention is not to be limited to the details of operation described nor by any theory advanced in explanation of the new results attained, but only by the terms of the accompanying claims in which it is our intention to claim all novelty inherent therein as broadly as possible in view of the prior art.

We claim as our invention:

1. A process for producing acetic acid and isobutylene which comprises contacting diacetone alcohol at a temperature between about 160° C. and about 350° C. with a calcined mixture of a phosphoric acid and a siliceous material.

2. The process of claim 1 in which the phosphorous content of the said calcined mixture is at least 22% and the free acid content is not more than 10% when calculated as $H_3PO_4$.

3. A process for producing acetic acid and isobutylene which comprises contacting diacetone alcohol at a temperature between about 160° C. and about 350° C. with a dehydration catalyst comprising an acid of phosphorus.

4. A process for producing acetic acid and isobutylene which comprises contacting diacetone alcohol at a temperature above about 160° C. but below the temperature at which substantial thermal decomposition takes place with evolution of carbon monoxide with a dehydration catalyst of acid character.

5. A process for producing isobutylene and a carboxylic acid which comprises contacting a ketol of the formula

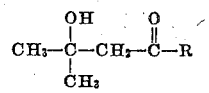

where R represents an alkyl group with a calcined mixture of an acid of phosphorus and a solid absorbent at a temperature above 160° C. but below the temperature at which substantial carbon monoxide is formed under the reaction conditions.

6. A process for producing isobutylene and a carboxylic acid which comprises contacting an hydroxy-ketaldone of the formula

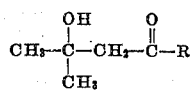

where R is a member of the group consisting of alkyl radicals and hydrogen with a dehydration catalyst comprising a phosphoric acid and a solid absorbent at a temperature above 160° C. but below the temperature at which substantial carbon monoxide is formed under the reaction conditions.

7. A process for producing acetic acid and a tertiary olefine which comprises contacting an aliphatic ketol having a tertiary carbinol group linked to an acetyl group by a methylene group with a catalyst comprising a phosphoric acid at a temperature between about 160° C. and about 400° C.

8. A process for producing a tertiary olefine and a carboxylic acid which comprises contacting an aliphatic ketol having a tertiary carbinol group linked to a ketone carbonyl group by a methylene group with a catalyst comprising a phosphoric acid at a temperature between about 160° C. and about 400° C.

9. A process for producing a tertiary olefine and a carboxylic acid which comprises contacting an aliphatic hydroxy-ketaldone having a tertiary carbinol group linked to a ketaldonyl group by a carbon atom to which at least one hydrogen atom is directly attached with a catalyst comprising a phosphoric acid at a temperature between about 160° C. and about 400° C.

10. A process for producing an olefine and a carboxylic acid which comprises contacting an aliphatic hydroxy-ketaldone having a carbinol group linked to a ketaldonyl group by a carbon atom to which at least one hydrogen atom is directly attached with a solid catalyst of acid character containing phosphorus at a temperature between about 160° C. and about 400° C.

11. A process for producing an olefine and a carboxylic acid which comprises contacting an aliphatic hydroxy-ketone having a carbinol group directly linked to a carbon atom to which at least one hydrogen atom is directly attached with a solid catalyst of acid character containing phosphorus at a temperature between about 160° C. and about 400° C.

12. A process for producing an olefine and a carboxylic acid which comprises contacting an aliphatic hydroxy-aldehyde having a carbinol group directly linked to a non-carbonyl carbon atom to which at least one hydrogen atom is directly attached at a temperature between about 160° C. and about 400° C. with a solid catalyst of acid character containing phosphorus.

13. A process of producing valuable products from hydroxy-ketaldones which comprises passing a hydroxy-ketaldone in the vapor phase at a temperature between 160° C. and 400° C. over a phosphoric acid catalyst at a rate at which conversion of the hydroxy-ketaldone to carboxylic acid and an unsaturated compound takes place.

14. A process of producing valuable products from hydroxy-ketaldones which comprises passing a hydroxy-ketaldone in the vapor phase at a temperature above 160° C. but below the temperature of thermal decomposition with splitting off of carbon monoxide over a phosphoric acid catalyst at a rate at which conversion of the hydroxy-ketaldone to a carboxylic acid and an unsaturated compound takes place.

15. A process of producing valuable products from hydroxy-ketaldones which comprises passing a hydroxy-ketaldone in the vapor phase at a temperature above 160° C. but below the temperature of thermal decomposition with splitting off of carbon monoxide over a solid catalyst of acid character at a rate at which conversion of the hydroxy-ketaldone to a carboxylic acid and an unsaturated compound takes place.

16. A process for producing organic carboxylic acids and unsaturated compounds from hydroxy-ketaldones which comprises contacting a hydroxy-ketaldone with a non-basic catalyst at a temperature above 160° C. until substantial formation of an organic carboxylic acid and an unsaturated compound takes place.

SUMNER H. McALLISTER.
CRAIG M. BOUTON.
WILLIAM A. BAILEY, Jr.